(12) United States Patent
Kodaira et al.

(10) Patent No.: US 10,805,478 B2
(45) Date of Patent: Oct. 13, 2020

(54) DETECTION APPARATUS AND IMAGE FORMING APPARATUS FOR CANCELING AN OPERATION OF THE DETECTION APPARATUS BASED ON A DETECTION RESULT

(71) Applicant: FUJI XEROX CO., LTD., Tokyo (JP)

(72) Inventors: Shunsuke Kodaira, Kanagawa (JP); Asako Takayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 172 days.

(21) Appl. No.: 15/939,481

(22) Filed: Mar. 29, 2018

(65) Prior Publication Data

US 2018/0302518 A1 Oct. 18, 2018

(30) Foreign Application Priority Data

Apr. 12, 2017 (JP) ................. 2017-079006

(51) Int. Cl.
| | |
|---|---|
| *G06F 15/00* | (2006.01) |
| *G06K 1/00* | (2006.01) |
| *G06K 15/00* | (2006.01) |
| *H04N 1/00* | (2006.01) |
| *H04W 4/80* | (2018.01) |
| *G06F 3/12* | (2006.01) |

(Continued)

(52) U.S. Cl.
CPC ....... *H04N 1/00037* (2013.01); *G06F 3/0421* (2013.01); *G06F 3/0482* (2013.01); *G06F 3/0485* (2013.01); *G06F 3/04855* (2013.01); *G06F 3/04883* (2013.01); *G06F 3/04886* (2013.01); *G06F 3/1207* (2013.01); *G06F 3/1259* (2013.01); *G06F 3/1292* (2013.01); *H04N 1/0044* (2013.01); *H04N 1/00925* (2013.01); *H04W 4/80* (2018.02); *G06F 2203/04104* (2013.01); *G06F 2203/04106* (2013.01)

(58) Field of Classification Search
CPC ............. H04N 1/00037; H04N 1/0044; H04N 1/00925; H04W 4/80; G06F 3/0421; G06F 3/0482; G06F 3/0485; G06F 3/04855; G06F 3/04883; G06F 3/04886; G06F 3/1207; G06F 3/1259; G06F 3/1292; G06F 2203/04104; G06F 2203/04106
USPC ............................ 358/1.14, 1.13, 1.15, 1.1
See application file for complete search history.

(56) References Cited

U.S. PATENT DOCUMENTS

| 10,628,820 | B2* | 4/2020 | Wyatt | ............... G06Q 20/352 |
| 2015/0341516 | A1* | 11/2015 | Hikichi | .............. H04N 1/00896 358/1.14 |
| 2018/0278769 | A1* | 9/2018 | Iwasaki | .............. H04N 1/00411 |

FOREIGN PATENT DOCUMENTS

| JP | 2016-221765 A | 12/2016 |
| WO | 2016/190425 A1 | 12/2016 |

\* cited by examiner

*Primary Examiner* — Douglas Q Tran
(74) *Attorney, Agent, or Firm* — Oliff PLC

(57) ABSTRACT

A detection apparatus includes a display, a communication unit, and a controller. The display displays an image and receives an operation corresponding to the image in such a manner that a user comes into contact with the image. The communication unit communicates with a wireless communication apparatus performing near-field wireless communication. Before or after the communication unit senses the wireless communication apparatus, when contact with the display is detected, the controller exercises control in such a manner that an operation of the detection apparatus based on the detection result is canceled.

7 Claims, 9 Drawing Sheets

(51) Int. Cl.
*G06F 3/0485* (2013.01)
*G06F 3/0488* (2013.01)
*G06F 3/042* (2006.01)
*G06F 3/0482* (2013.01)

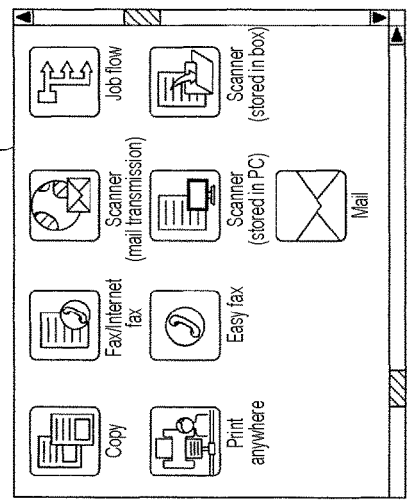
FIG. 9C
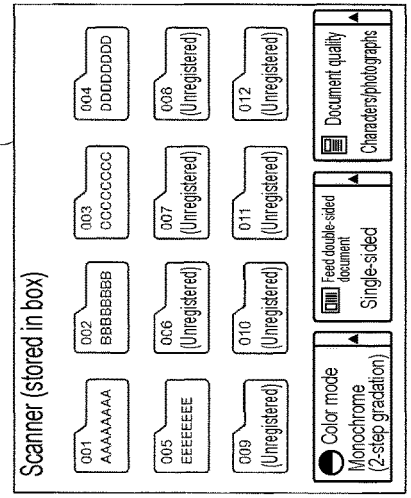
FIG. 9E
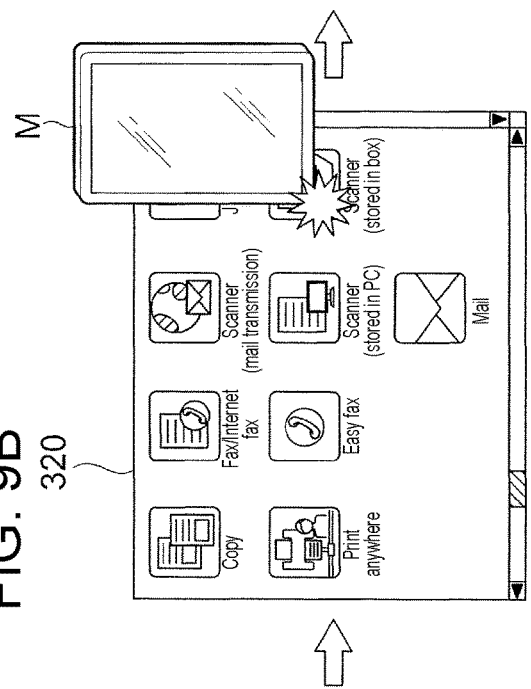
FIG. 9B
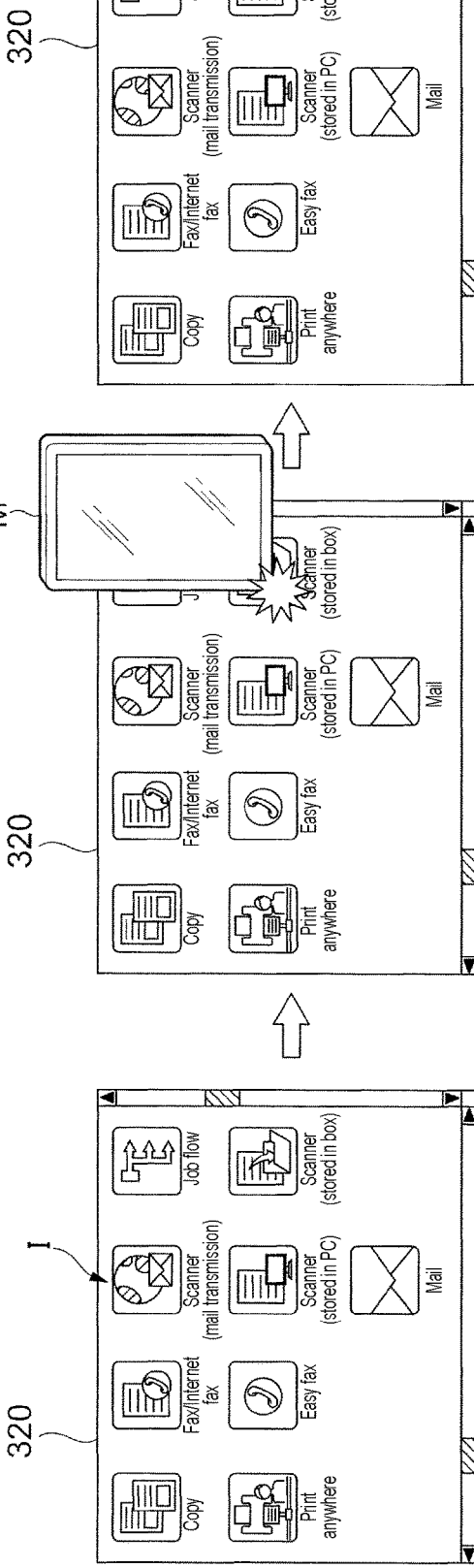
FIG. 9D
FIG. 9A
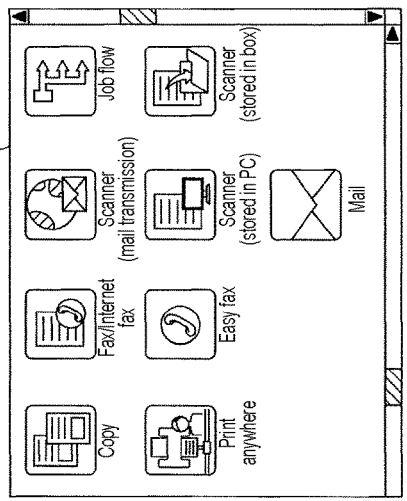

DETECTION APPARATUS AND IMAGE FORMING APPARATUS FOR CANCELING AN OPERATION OF THE DETECTION APPARATUS BASED ON A DETECTION RESULT

CROSS-REFERENCE TO RELATED APPLICATIONS

This application is based on and claims priority under 35 USC 119 from Japanese Patent Application No. 2017-079006 filed Apr. 12, 2017.

BACKGROUND

(i) Technical Field

The present invention relates to a detection apparatus and an image forming apparatus.

(ii) Related Art

To provide an input unit for inputting information for operating an apparatus, hardware keys that are physical keys, such as buttons and switches, and software keys that are keys displayed on a display through software control may be disposed in a user interface.

In contrast, a communication unit may be provided for a user interface recently. Information for operating an apparatus, or the like is set in advance in a wireless communication apparatus such as a terminal apparatus. The communication unit performs near-field wireless communication (near field communication (NFC)) with the wireless communication apparatus so as to receive input of the information that is set in the wireless communication apparatus.

SUMMARY

According to an aspect of the invention, there is provided a detection apparatus including a display, a communication unit, and a controller. The display displays an image and receives an operation corresponding to the image in such a manner that a user comes into contact with the image. The communication unit communicates with a wireless communication apparatus performing near-field wireless communication. Before or after the communication unit senses the wireless communication apparatus, when contact with the display is detected, the controller exercises control in such a manner that an operation of the detection apparatus based on the detection result is canceled.

BRIEF DESCRIPTION OF THE DRAWINGS

Exemplary embodiments of the present invention will be described in detail based on the following figures, wherein:

FIGS. 9A to 9E are diagrams illustrating concrete operations performed when an operation controller determines that a determined operation is to be canceled.

DETAILED DESCRIPTION

Referring to the attached drawings, exemplary embodiments will be described in detail.

Description about the Overall Configuration of an Image Forming Apparatus 1

Figure 1:
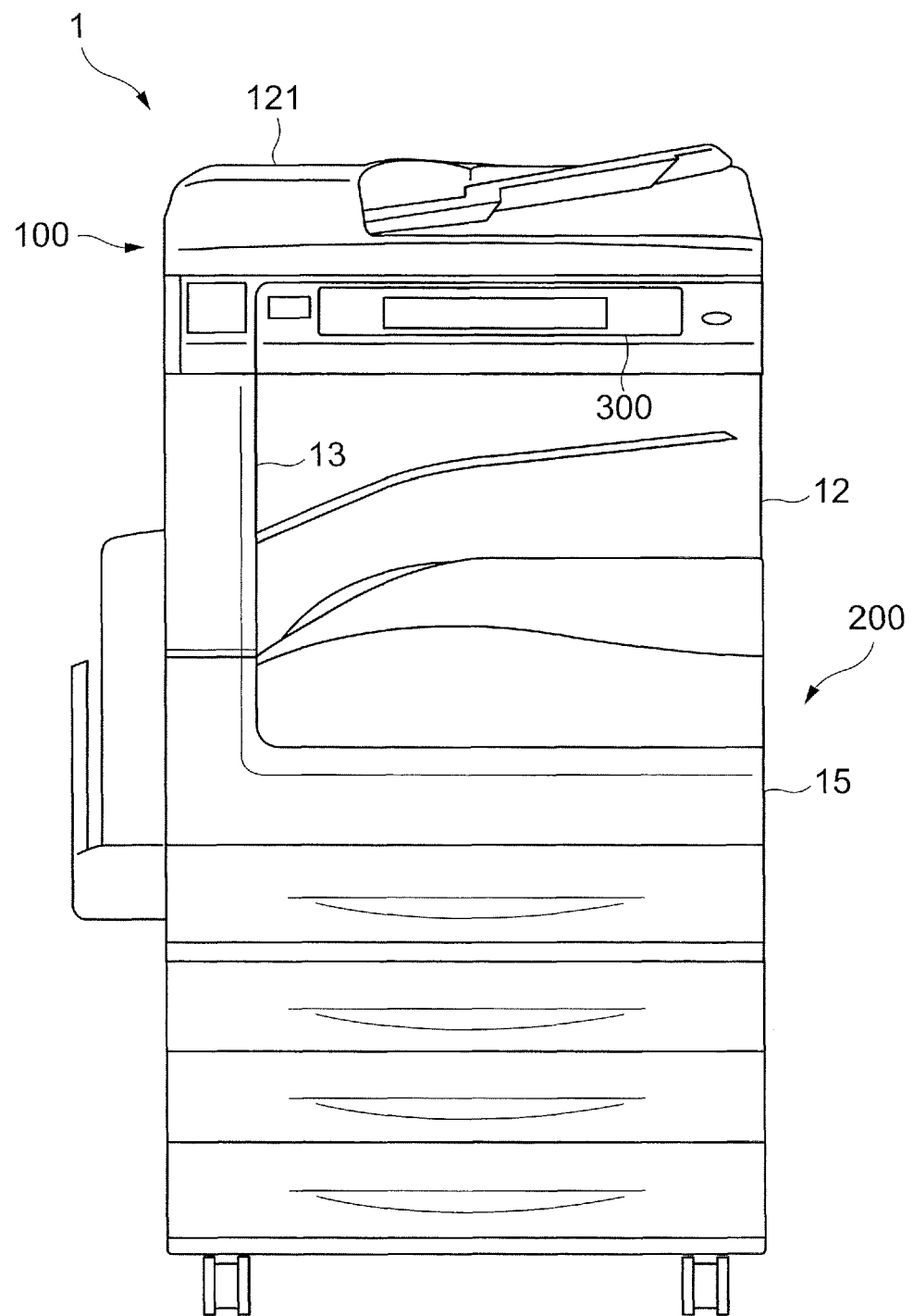
FIG. 1 is an external view of an image forming apparatus according to an exemplary embodiment.
Figure 2:
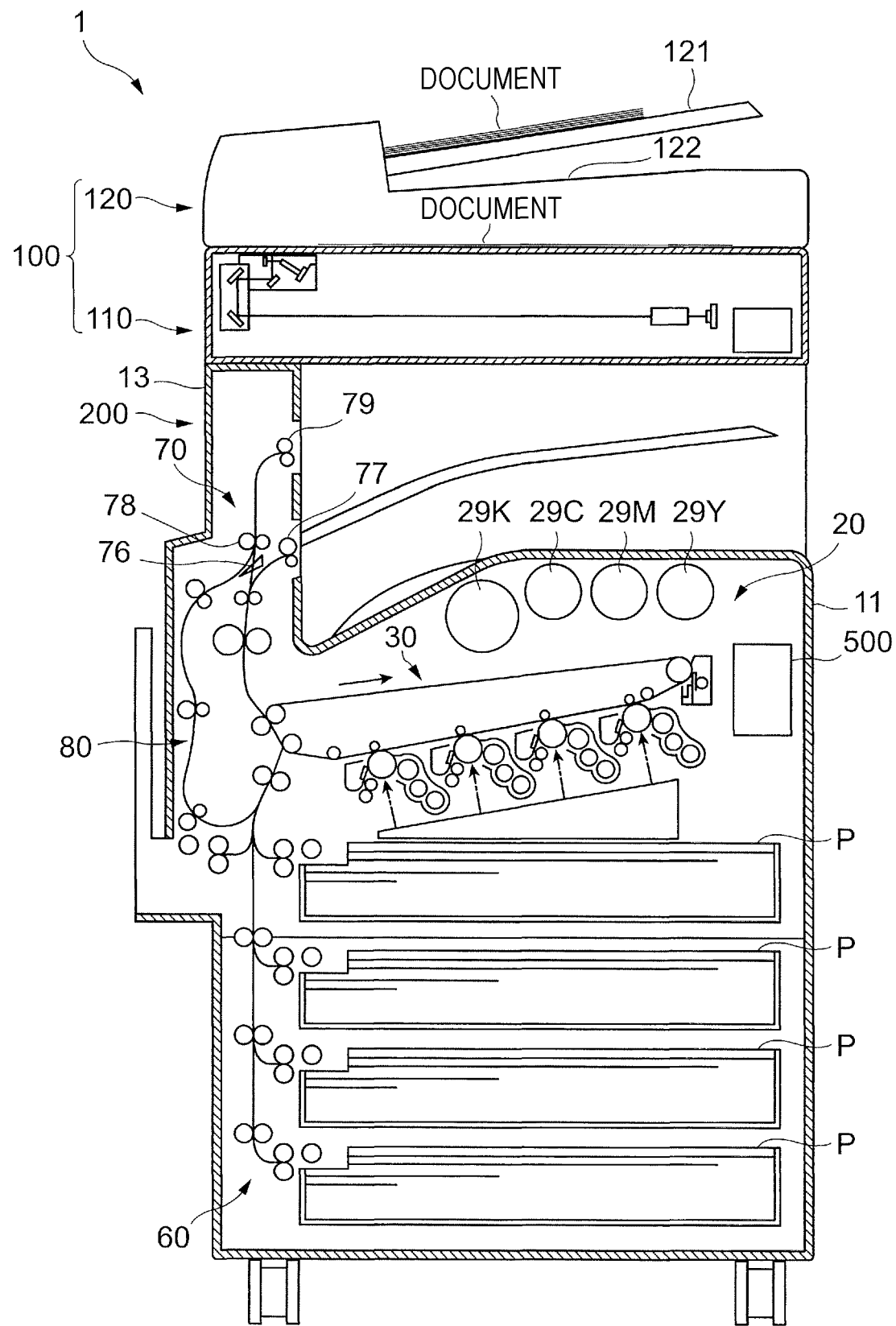
FIG. 2 is a diagram illustrating the internal configuration of the image forming apparatus according to the exemplary embodiment.

FIG. 1 is an external view of an image forming apparatus 1 according to an exemplary embodiment. FIG. 2 is a diagram illustrating the internal configuration of the image forming apparatus 1 according to the present exemplary embodiment.

The image forming apparatus 1 includes an image reading apparatus 100 that reads a document image, and an image recording apparatus 200 that records an image on recording material (may be hereinafter referred to as a "sheet" as a typical object). The image forming apparatus 1 also includes a user interface (UI) 300 that receives input of operations from a user and that displays various types of information to a user. The image forming apparatus 1 further includes a control device 500 that controls the operation of the entire image forming apparatus 1.

The image reading apparatus 100 is disposed in an upper portion of the image forming apparatus 1. The image recording apparatus 200 is disposed below the image reading apparatus 100, and includes the control device 500. The user interface 300 is disposed on the front side of an upper portion of the image forming apparatus 1, that is, on the front side of an image reading unit 110 of the image reading apparatus 100, which is described below.

The image reading apparatus 100 includes the image reading unit 110 that reads a document image and a document conveying unit 120 that conveys a document to the image reading unit 110. The document conveying unit 120 is disposed in an upper portion of the image reading apparatus 100. The image reading unit 110 is disposed in a lower portion of the image reading apparatus 100.

The document conveying unit 120 includes a document holding unit 121 that holds a document and a document discharging unit 122 that discharges a document having been conveyed from the document holding unit 121. The document conveying unit 120 conveys a document from the document holding unit 121 to the document discharging unit 122. The document conveying unit 120 is also called an auto document feeder (ADF).

The image recording apparatus 200 includes an image forming unit 20, a sheet supply unit 60, a sheet discharging unit 70, and a reverse conveying unit 80. The image forming unit 20 forms an image on a sheet P. The sheet supply unit 60 supplies a sheet P to the image forming unit 20. The sheet discharging unit 70 discharges a sheet P on which the image forming unit 20 has formed an image. The reverse conveying unit 80 reverses a sheet P upside down, on one side of which the image forming unit 20 has formed an image, and conveys the sheet P to the image forming unit 20 again.

The image recording apparatus 200 includes an apparatus body frame 11 and an apparatus housing 12. The apparatus body frame 11 supports the image forming unit 20, the sheet supply unit 60, the sheet discharging unit 70, the reverse conveying unit 80, and the control device 500 directly or indirectly. The apparatus housing 12 is attached to the apparatus body frame 11 so as to form the outer surfaces of the image forming apparatus 1.

The apparatus body frame 11 includes a reading apparatus supporting unit 13 in which a switching gate 76, a first discharge roller 77, a conveyance roller 78, a second discharge roller 79, and the like are provided at one end, in the horizontal direction, of the image forming apparatus 1. The reading apparatus supporting unit 13 also extends in the vertical direction and supports the image reading apparatus 100. The reading apparatus supporting unit 13 supports the image reading apparatus 100 in cooperation with a back-side portion of the apparatus body frame 11.

The image recording apparatus 200 includes a front cover 15 that is provided, as a part of the apparatus housing 12, on the front side of the image forming unit 20, and that is mounted so as to be openable in relation to the apparatus body frame 11.

A user opens the front cover 15 so that an intermediate transfer unit 30 and toner cartridges 29Y, 29M, 29C, and 29K in the image forming unit 20 may be replaced with new ones.

The user interface 300 is an exemplary receiving unit (receiving device) that receives a user instruction for the image forming apparatus 1, and includes a light detecting unit and a display, which are described in detail below. The user interface 300 provides various types of information to a user through a screen displayed on the display. When the user performs an operation on the display, the light detecting unit detects the operation. As a result, the user may input an instruction for the image forming apparatus 1.

Description About Operations of the Image Forming Apparatus 1

The image forming apparatus 1 having the above-described configuration operates as follows.

For example, a user may use the image forming apparatus 1 to copy a document. That is, on the basis of image data of a document that is read by the image reading apparatus 100, the image recording apparatus 200 may form an image on a sheet P so that the document is copied. In addition, a user may transmit, to the image forming apparatus 1, a print job from a personal computer (PC) or the like (not illustrated) connected to a communication line so that printing is performed. That is, a print job may be received through the communication line. On the basis of image data included in the print job, the image recording apparatus 200 may form an image on a sheet P so that printing is performed. Further, a user may perform facsimile transmission/reception. That is, image data of a document that is read by the image reading apparatus 100 may be transmitted through a communication line. In addition, a user may store image data of a document. That is, image data of a document may be stored in the image forming apparatus 1 or a PC connected to a communication line.

Description About the User Interface 300

Figure 3A:
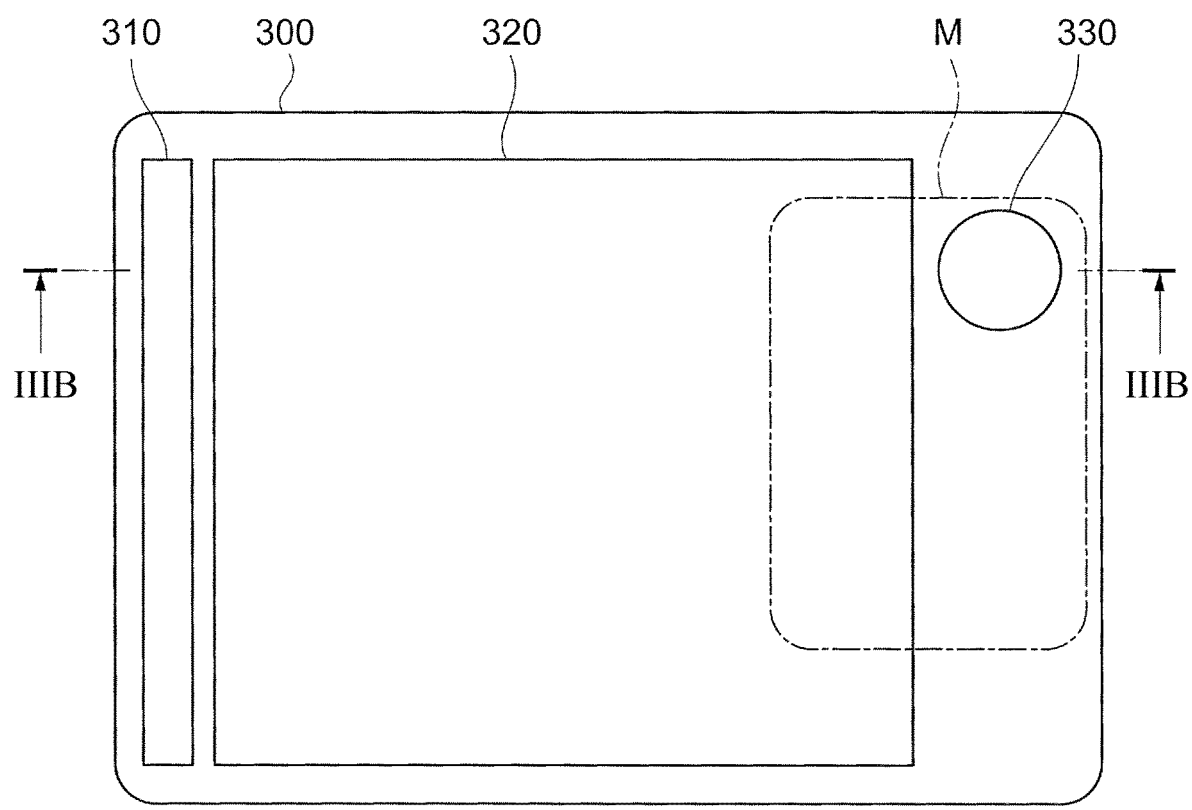
FIG. 3A is a diagram illustrating a user interface according to the exemplary embodiment.
Figure 3B:
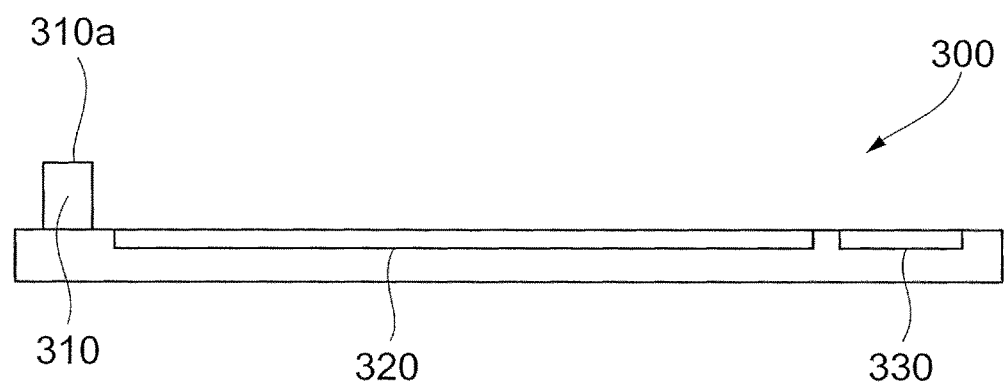
FIG. 3B is a IIIB-IIIB sectional view of the user interface illustrated in FIG. 3A.

FIG. 3A is a diagram illustrating the user interface 300 according to the present exemplary embodiment. FIG. 3A illustrates a case in which the user interface 300 is viewed from above. FIG. 3B is a IIIB-IIIB sectional view of the user interface 300 illustrated in FIG. 3A.

As illustrated in FIG. 3A, the user interface 300 includes a light detecting unit 310 that optically detects a detection target, a display 320 that displays an image, and a communication unit 330 that performs wireless communication.

The light detecting unit 310 which is also called, for example, an optical sensing bar detects the position of a detection target. When a user is to operate the user interface 300, for example, in such a manner that a touch operation is performed by using their finger, the light detecting unit 310 detects the user's finger as a detection target. The light detecting unit 310 may detect an object other than a user's finger as long as the object is used to touch the user interface 300. Thus, a detection target may be, for example, a touch pen.

Figure 4:
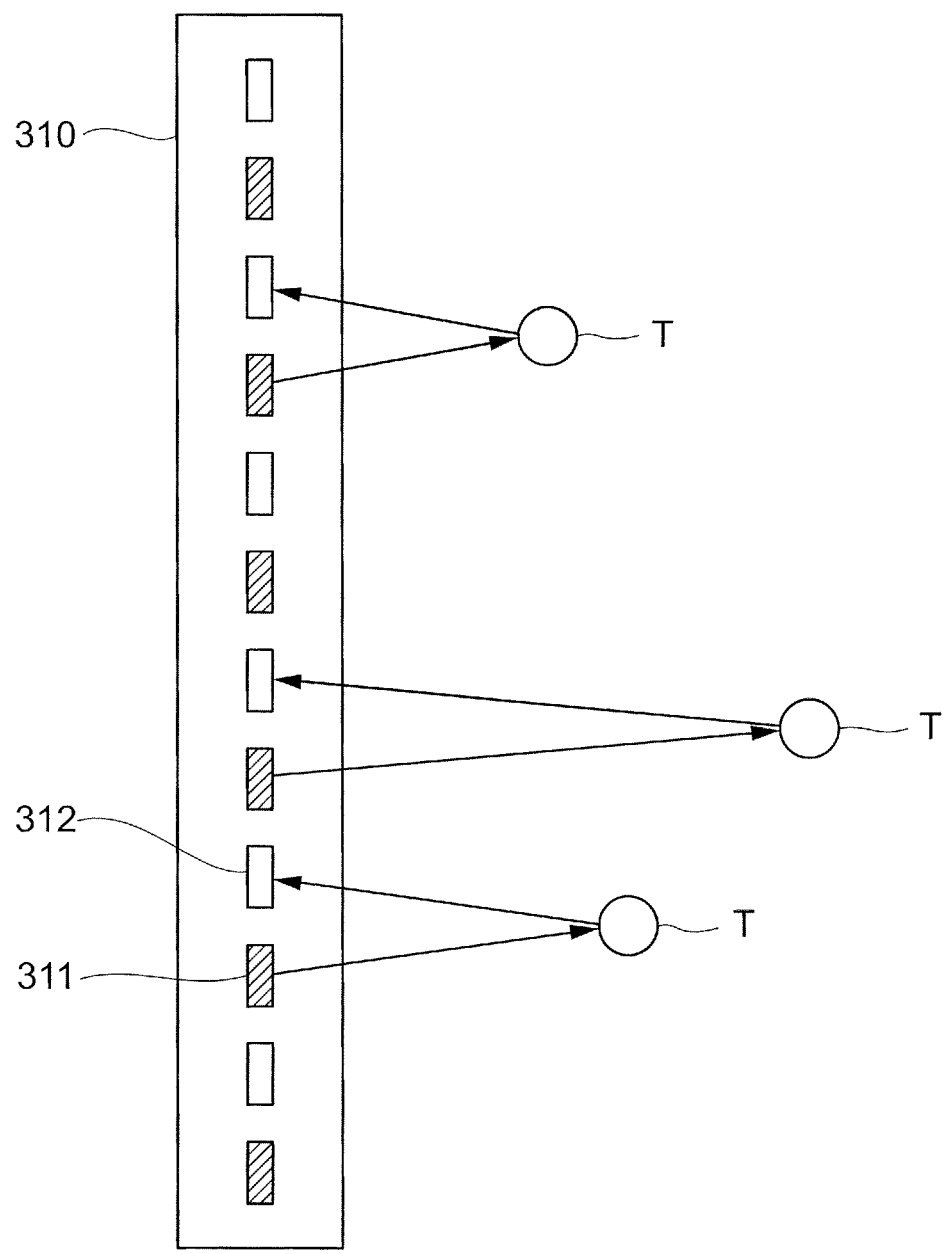
FIG. 4 is a diagram describing how a light detecting unit detects a detection target.

FIG. 4 is a diagram describing how the light detecting unit 310 detects a detection target T.

As illustrated in FIG. 4, the light detecting unit 310 includes light emitting units 311 that emit light and light receiving units 312 that receive light.

Each of the light emitting units 311 includes a light emitting diode (LED), and emits light such as infrared rays.

Each of the light receiving units 312 includes a photodiode (PD), and receives reflected light from a detection target T. The light receiving unit 312 outputs a detection signal in accordance with the reflected light.

As illustrated in FIG. 4, the light emitting units 311 and the light receiving units 312 are alternately arranged in a line.

In this configuration, each of the light receiving units 312 receives reflected light produced when light emitted from the corresponding one of the light emitting units 311 is reflected from a detection target T. Thus, the light detecting unit 310 may detect the position of the detection target T that is present on or above the display 320. To put it another way, the light detecting unit 310 may detect the two-dimensional position of a detection target T, which is a position specified in the vertical and horizontal directions. That is, the position of a detection target T in the horizontal direction in FIG. 4 may be specified by determining which light receiving unit 312 has detected reflected light. The position of a detection target T in the vertical direction in FIG. 4 may be specified by using the intensity of light received by the light receiving unit 312. That is, the closer a detection target T is from the light detecting unit 310, the higher the intensity of light received by a light receiving unit 312 is. In contrast, the farther a detection target T is from the light detecting unit 310, the lower the intensity of light received by a light receiving unit 312 is. Therefore, by using the intensity of light received by a light receiving unit 312, the distance between the light detecting unit 310 and a detection target T may be determined. Thus, the position of the detection target T in the vertical direction in FIG. 4 may be specified. Even when multiple detection targets T are present, the light detecting unit 310 may detect the detection targets T individually. This enables detection of so-called multi-touch operation.

As illustrated in FIG. 3B, the light detecting unit 310 includes a protrusion portion 310a that protrudes from the surface on which the display 320 of the user interface 300 is provided. In the protrusion portion 310a, the light emitting units 311 and the light receiving units 312 illustrated in FIG. 4 are arranged. When a light ray, among light rays emitted from a light emitting unit 311, traveling along the surface on which the display 320 of the user interface 300 is provided hits a detection target T, the ray is reflected, forming reflected light. A light ray, among the reflected light rays from the detection target T, traveling along the surface on which the display 320 is provided is received by a light receiving unit 312.

The display 320 which is, for example, a liquid crystal panel displays information about the image forming apparatus 1 as an image, and receives an operation corresponding to the image when a user comes into contact with the image. The expression "contact" is not limited to a case in which the display 320 is actually touched by a detection target T. That is, as a result of a detection target T coming close to the display 320, even when the display 320 is not actually touched, the light detecting unit 310 may detect reflected light from the detection target T. This may result in determination that the detection target T has come into contact with the display 320. Therefore, in the exemplary embodiment, "contact" encompasses not only a case in which a user actually touches the display 320 by using a detection target T, but also a case in which, as a result of a detection target T coming close to the display 320, the detection target T is detected.

As illustrated in FIG. 3A, the display 320 is rectangular. A single light detecting unit 310 is disposed along one side of the display 320. In this example, the light detecting unit 310 is disposed along the left side of the display 320.

Figure 5:
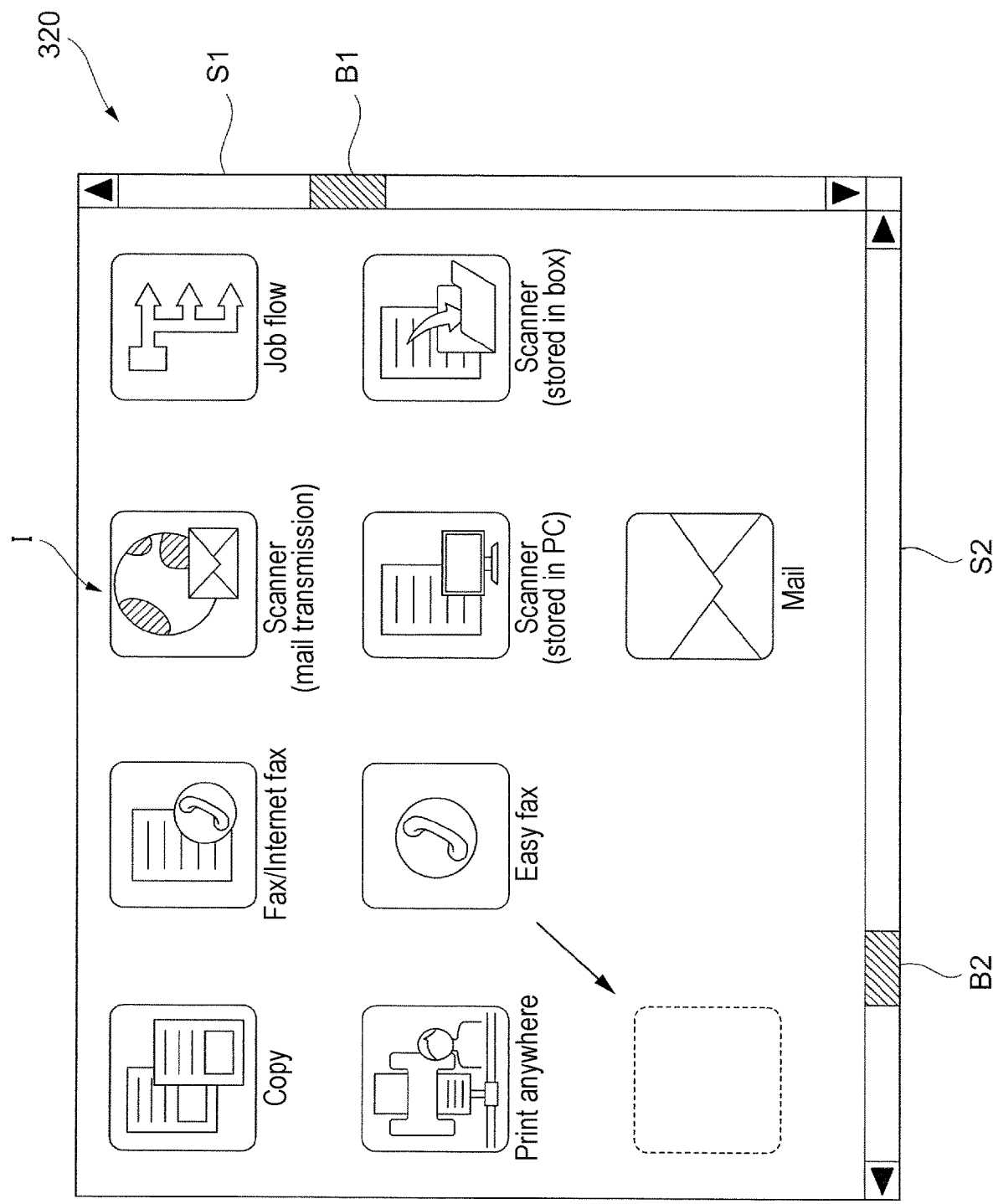
FIG. 5 is a diagram illustrating concrete, exemplary user operations performed on a display.

FIG. 5 is a diagram illustrating concrete, exemplary user operations performed on the display 320.

In this example, a list of icons I for performing functions provided for the image forming apparatus 1 is displayed on the display 320 as an image. The image indicates a so-called home screen. The icons I displayed in the image are associated with predetermined processes. By selecting one of the icons I, the corresponding process is performed.

In the example illustrated in FIG. 5, icons I indicating functions of "Copy", "Fax/Internet fax", "Scanner (mail transmission)", "Job flow", "Print anywhere", "Easy fax", "Scanner (stored in PC)", "Scanner (stored in box)", and "Mail" are displayed on the display 320.

To use a target function, a user touches one of the icons I. When the user touches an icon I, for example, a setting screen corresponding to the function associated with the icons I is displayed. For example, when the "Copy" icon I is touched, a screen in which the number of copies, selection of a sheet to be used, selection of color/monochrome, and scaling up/down are set is displayed as a setting screen for copying a document. After a setting operation, when the user presses a start button described below, an actual copy operation is started.

A user operation of dragging any of the icons I indicates an operation of moving the icon I. For example, when a user wants to move the "Easy fax" icon I to the position indicated by using a dotted line, the user may drag the icon I.

On the display 320, a scroll bar S1 for scrolling the screen in the vertical direction and a scroll bar S2 for scrolling the screen in the horizontal direction are displayed.

In this case, when a user touches an arrow mark provided for the scroll bar S1 or the scroll bar S2, the screen may be scrolled in a direction indicated by the arrow mark. When a user drags a scroll button B1 provided for the scroll bar S1 or a scroll button B2 provided for the scroll bar S2 so as to move the scroll button B1 or the scroll button B2, the screen may be scrolled in a direction in accordance with the movement of the scroll button B1 or the scroll button B2. Scrolling enables an image, which is too large to display in a single screen, to be displayed.

The communication unit 330 communicates with a wireless communication apparatus M that performs near-field wireless communication.

Near-field wireless communication (near field communication (NFC)) is performed using a standard of wireless communication, for example, over a restricted communication range of about 10 cm. In the exemplary embodiment, near-field wireless communication refers to general short-distance wireless communication that is wireless communication over a short range, and any standard may be used.

The wireless communication apparatus M is not limited to a specific apparatus as long as wireless communication using NFC may be performed. For example, the wireless communication apparatus M is a terminal apparatus, such as a smartphone or a tablet.

When a user presents the wireless communication apparatus M to the communication unit 330 or touches the communication unit 330 with the wireless communication apparatus M, NFC communication is automatically performed between the wireless communication apparatus M and the communication unit 330. In FIG. 3A, an exemplary position at which the wireless communication apparatus M is presented is indicated by using a long dashed short dashed line.

Thus, a user stores a processing condition for performing processing on the image forming apparatus 1, such as an image formation condition, in advance in the wireless communication apparatus M. Through NFC communication, the processing condition may be input via the communication unit 330.

It is desirable that the display 320 be disposed close to the communication unit 330 in terms of user operability.

However, when a user presents the wireless communication apparatus M to the communication unit 330 disposed close to the display 320, the wireless communication apparatus M may come into contact with the display 320. As a result, for example, it is determined that the user has touched any of the icons I. Consequently, an operation of the image forming apparatus 1, which is different from an operation of the image forming apparatus 1 caused by communication between the wireless communication apparatus M and the image forming apparatus 1, is initiated.

For example, when the wireless communication apparatus M comes into contact with the "Scanner (stored in box)" icon I, an application corresponding to this icon I is activated, and a setting screen for the "Scanner (stored in box)" function is displayed on the display 320.

In the present exemplary embodiment, the control device 500 has a configuration described below in order to suppress this issue.

Description About the Control Device 500

Figure 6:
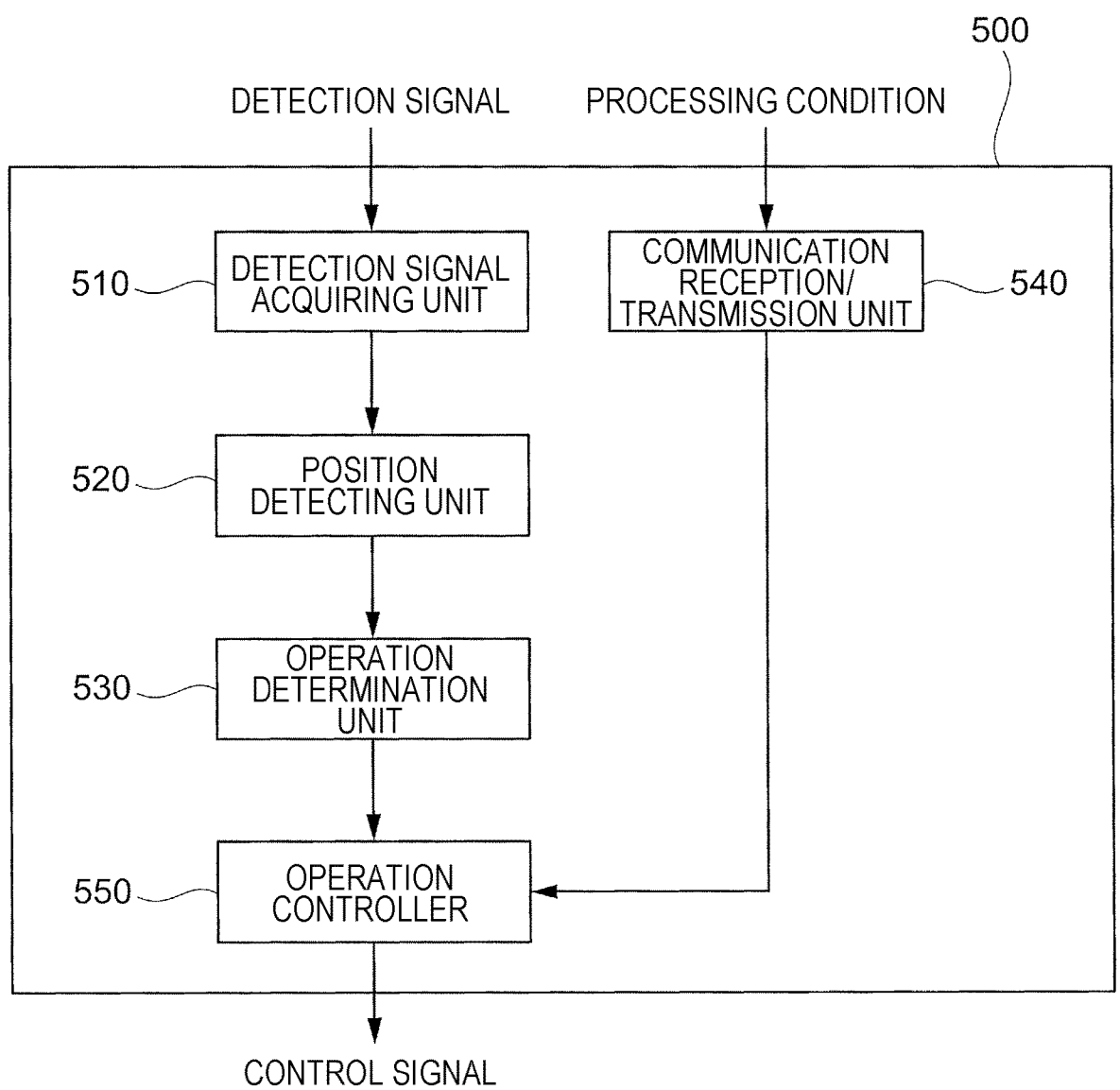
FIG. 6 is a block diagram illustrating an exemplary functional configuration of a control device.

FIG. 6 is a block diagram illustrating an exemplary functional configuration of the control device 500. FIG. 6 illustrates functions that are related to the present exemplary embodiment and that are selected from among various functions provided for the control device 500.

The control device 500 is an exemplary controller that has control over the image forming apparatus 1 on the basis of the result of a user operation received by the user interface 300.

As illustrated in FIG. 6, the control device 500 according to the present exemplary embodiment includes a detection signal acquiring unit 510, a position detecting unit 520, an operation determination unit 530, a communication reception/transmission unit 540, and an operation controller 550.

The detection signal acquiring unit 510 acquires a detection signal from the light detecting unit 310. The detection signal contains information about the position of a light receiving unit 312 that has received reflected light from a detection target and the intensity of light received by a light receiving unit 312.

The position detecting unit 520 obtains the position of the detection target on the basis of the detection signal acquired by the detection signal acquiring unit 510. As described in FIG. 4, the position may be obtained by using information describing which light receiving unit 312 has detected reflected light, and the intensity of light received by the light receiving unit 312.

The operation determination unit 530 determines a user operation on the basis of the position obtained by the position detecting unit 520. That is, as described above, the operation determination unit 530 determines whether or not, for example, touching, dragging, or swiping has been performed as a user operation on the basis of the position obtained by the position detecting unit 520.

The communication reception/transmission unit 540 receives/transmits information from/to the wireless communication apparatus M through the communication unit 330. Thus, the communication reception/transmission unit 540 may receive a processing condition for performing processing on the image forming apparatus 1, such as an image formation condition.

The operation controller 550 outputs a control signal on the basis of the position of the detection target determined by the position detecting unit 520, the user operation determined by the operation determination unit 530, and the processing condition received by the communication reception/transmission unit 540. Thus, the operation controller 550 controls an operation of the image forming apparatus 1. For example, on the display 320, when it is determined that a user has touched the "Copy" icon I, a screen for setting a copy operation is displayed. The settings for a copy operation are determined on the basis of the processing condition received by the communication reception/transmission unit 540. When it is determined that the user has touched a start button (not illustrated), an actual copy operation is started.

When contact with the display 320 is detected before and after the communication unit 330 senses the wireless communication apparatus M, the operation controller 550 exercises control so that an operation of the image forming apparatus 1 based on the detection result is canceled.

The expression "before and after the communication unit 330 senses the wireless communication apparatus M" means a short predetermined period or less before or after the time at which the communication unit 330 senses the wireless communication apparatus M. This period is, for example, one second or less.

Specifically, a time at which the detection signal acquiring unit 510 acquires a detection signal from the light detecting unit 310 is compared with a time at which the communication reception/transmission unit 540 receives a processing condition. When the time difference is equal to or less than a predetermined threshold, it is determined that the wireless communication apparatus M has come into contact with the display 320, and the determined operation is canceled. That is, when the wireless communication apparatus M comes into contact with the display 320, the time at which the wireless communication apparatus M comes into contact with the display 320 is almost simultaneous with the time at which processing condition is received. Therefore, when these times are almost simultaneous with each other, it may be presumed that the wireless communication apparatus M comes into contact with the display 320. Therefore, the determined operation is canceled.

In contrast, when the time difference exceeds the predetermined threshold, the determined operation is not canceled. Typically, a user separately, not almost the same time, performs an operation in which the user presents the wireless communication apparatus M to the communication unit 330, and an operation in which the user comes into contact with the display 320 with their finger or the like. Therefore, when the time difference exceeds the predetermined threshold, it may be presumed that the user performs these two operations separately.

In this case, when contact in a certain portion of the display 320 is detected, the operation controller 550 may exercise control so that the operation of the image forming apparatus 1 based on the detection result is canceled.

That is, the wireless communication apparatus M is easy to come into contact with the display 320 on the near side from the communication unit 330, and is difficult, on the far side. Therefore, only when the wireless communication apparatus M comes into contact on the near side from the communication unit 330, control may be exercised so that the operation is canceled. Accordingly, when contact with the display 320 in a predetermined region of the display 320 which is present on the near side from the communication unit 330 is detected, the operation controller 550 exercises control so that the operation of the image forming apparatus 1 based on the detection result is canceled. In contrast, when contact with the display 320 in a predetermined region of the display 320 which is present on the far side from the communication unit 330 is detected, the operation controller 550 exercises control so that the operation of the image forming apparatus 1 based on the detection result is continued. That is, control for canceling the operation is not exercised.

The expression "a predetermined region of the display 320 which is present on the near side from the communication unit 330" indicates a region that is virtually set on the display 320 as a region in which the wireless communication apparatus M is easy to come into contact. Such a region is set on the communication unit 330 side of the display 320. The expression "a predetermined region of the display 320 which is present on the far side from the communication unit 330" indicates a region that is virtually set on the display 320 as a region in which the wireless communication apparatus M is difficult to come into contact. Such a region is set on the opposite side to the communication unit 330 side of the display 320. Specifically, for example, half the region of the display 320 on the communication unit 330 side (for example, in FIGS. 3A and 3B, the right half of the display 320) may be set as "a predetermined region of the display 320 which is present on the near side from the communication unit 330". Half the region of the display 320 on the opposite side to the communication unit 330 side (for example, in FIGS. 3A and 3B, the left half of the display 320) may be set as "a predetermined region of the display 320 which is present on the far side from the communication unit 330".

Figure 7:
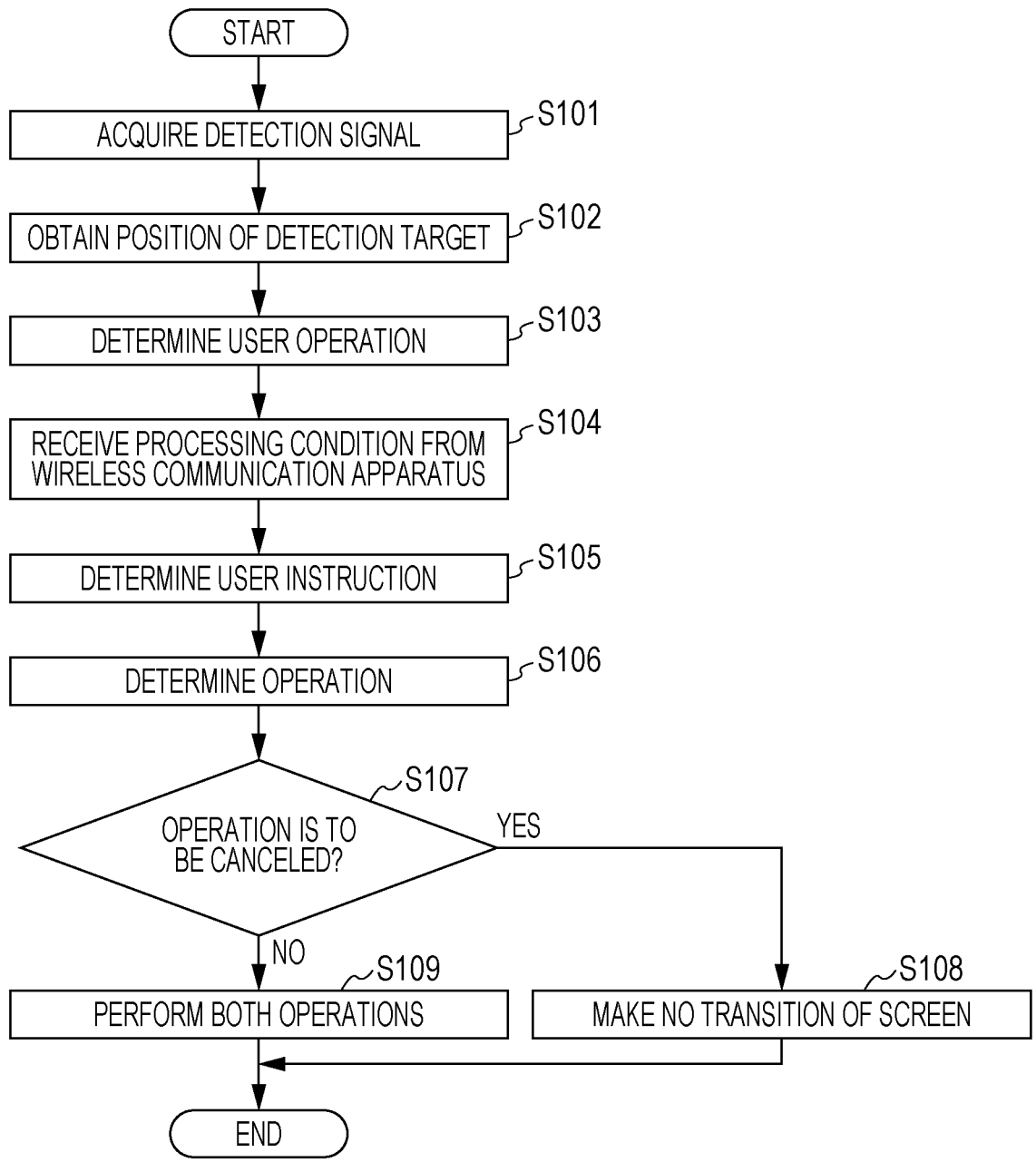
FIG. 7 is a flowchart of a first exemplary operation of the control device.

FIG. 7 is a flowchart of a first exemplary operation of the control device 500.

First, the detection signal acquiring unit 510 acquires a detection signal from the light detecting unit 310 (step 101).

Then, the position detecting unit 520 obtains the position of a detection target on the basis of the detection signal (step 102).

The operation determination unit 530 determines a user operation on the basis of the position obtained by the position detecting unit 520 (step 103).

The communication reception/transmission unit 540 receives/transmits information from/to the wireless communication apparatus M through the communication unit 330, and receives a processing condition for performing processing on the image forming apparatus 1 (step 104). The processing condition includes information for establishing communication from the wireless communication apparatus M (for example, the media access control (MAC) address of the image forming apparatus 1, the Internet protocol (IP) address or the service set identifier (SSID) of the image forming apparatus 1) and image data to be printed.

The operation controller 550 determines the instruction that is input by the user, on the basis of the position of the detection target which is determined by the position detecting unit 520, the user operation determined by the operation determination unit 530, and the processing condition received by the communication reception/transmission unit 540 (step 105).

The operation controller 550 determines an operation that is to be performed on the image forming apparatus 1, on the basis of the instruction that is input by the user (step 106).

The operation controller 550 determines whether or not the determined operation is to be canceled (step 107). Specifically, as described above, the time at which the detection signal acquiring unit 510 acquires the detection signal from the light detecting unit 310 is compared with the time at which the communication reception/transmission unit 540 receives the processing condition. When the time difference is equal to or less than the predetermined threshold, it is determined that the determined operation is to be canceled. In contrast, when the time difference exceeds the predetermined threshold, the determined operation is not to be canceled.

Specifically, the operation controller 550 performs determination as follows.

(1) After a detection signal is acquired from the light detecting unit 310, when a processing condition is received from the wireless communication apparatus M in a time difference equal to or less than the threshold, the operation controller 550 determines that the determined operation is to be canceled.

(2) After a detection signal is acquired from the light detecting unit 310, when a processing condition is received from the wireless communication apparatus M in a time difference exceeding the threshold, or when a processing condition is not received from the wireless communication apparatus M, the operation controller 550 determines that the determined operation is not to be canceled.

(3) After a processing condition is received from the wireless communication apparatus M, when a detection signal is acquired from the light detecting unit 310 in a time difference equal to or less than the threshold, the operation controller 550 determines that the determined operation is to be canceled.

(4) After a processing condition is received from the wireless communication apparatus M, when a detection signal is acquired from the light detecting unit 310 in a time difference exceeding the threshold, or when a processing condition is not received from the wireless communication apparatus M, the operation controller 550 determines that the determined operation is not to be canceled.

If the operation controller 550 determines that the determined operation is to be canceled (YES in step 107, in the cases of (1) and (3) described above), the operation controller 550 ignores the detection signal from the light detecting unit 310, and does not perform the operation of the image forming apparatus 1 which is indicated in the instruction from the user. In this case, the screen displayed on the display 320 is not changed, and the screen display is maintained (step 108).

After that, an operation of the image forming apparatus 1 may be further controlled in accordance with the instruction transmitted from the wireless communication apparatus M. For example, a screen that is used to perform processing and that is transmitted from the wireless communication apparatus M is displayed on the display 320.

In contrast, if the operation controller 550 determines that the determined operation is not to be canceled (NO in step 107, in the cases of (2) and (4) described above), the operation controller 550 performs both of the operation determined in step 106 and the operation indicated in the instruction transmitted from the wireless communication apparatus M (step 109). In the case of (2) described above, the operation determined in step 106 is first performed, and the operation indicated in the instruction transmitted from the wireless communication apparatus M is then performed. In contrast, in the case of (4) described above, the operation indicated in the instruction transmitted from the wireless communication apparatus M is first performed, and the operation determined in step 106 is then performed.

Figure 8:
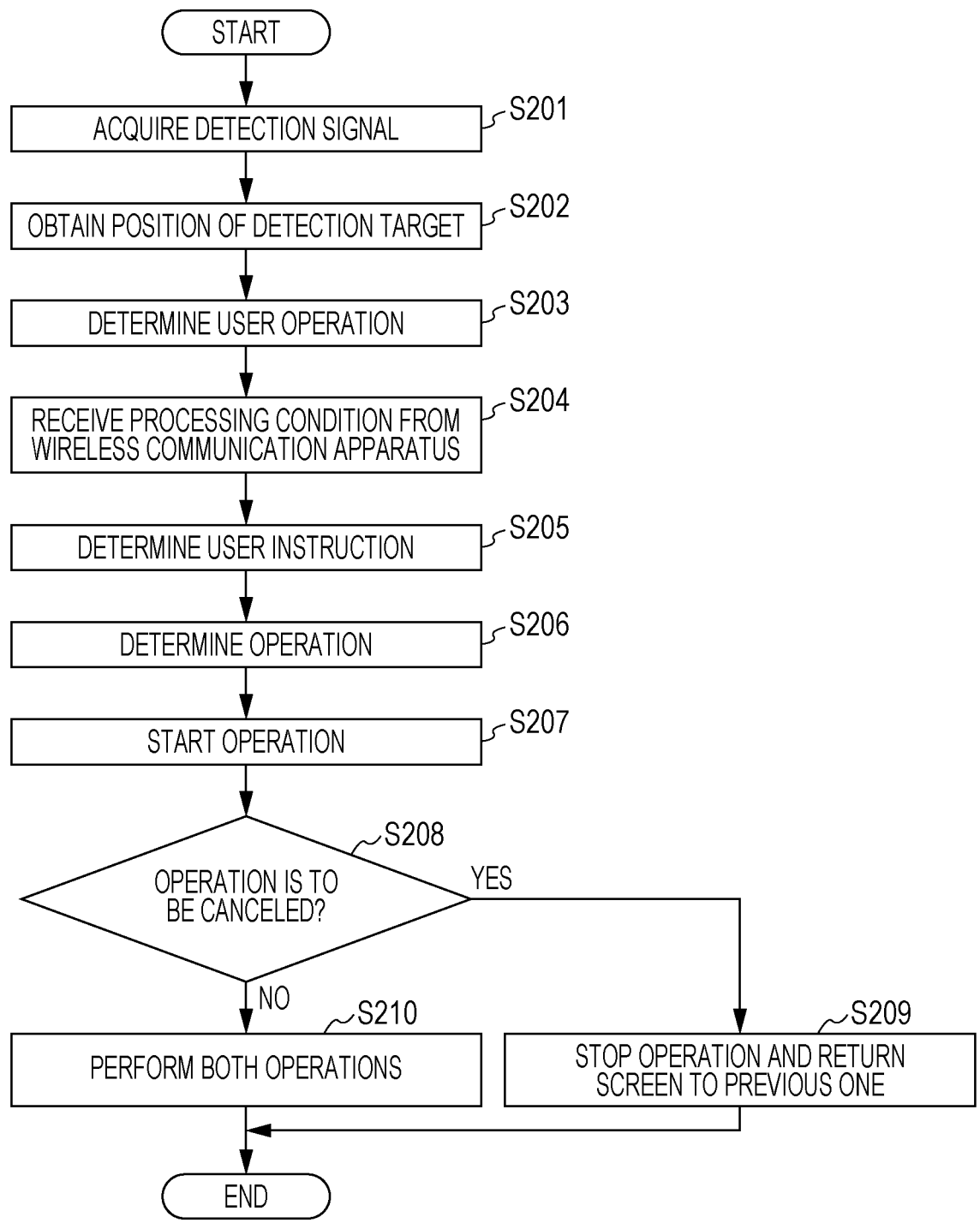
FIG. 8 is a flowchart of a second exemplary operation of the control device.

FIG. 8 is a flowchart of a second exemplary operation of the control device 500.

Steps 201 to 206 in FIG. 8 are similar to steps 101 to 106 in FIG. 7, and will not be described.

After step 206, the operation controller 550 first starts operating the image forming apparatus 1 in accordance with the determined operation (step 207).

Similarly to step 107 in FIG. 7, the operation controller 550 determines whether or not the determined operation is to be canceled (step 208). Also in this case, the operation controller 550 performs determination, for example, described above in (1) to (4).

If the operation controller 550 determines that the determined operation is to be canceled (YES in step 208, in the cases of (1) and (3) described above), the operation controller 550 stops the operation having been started, and returns the state to the state before the operation (step 209). That is, the screen displayed on the display 320 is returned to the screen before the operation, and the screen display previously displayed is maintained.

After that, similarly to the above-described case, an operation of the image forming apparatus 1 may be further controlled in accordance with the instruction transmitted from the wireless communication apparatus M.

In contrast, if the operation controller 550 determines that the determined operation is not to be canceled (NO in step 208, in the cases of (2) and (4) described above), the operation controller 550 performs both of the operation determined in step 206 and the operation indicated in the instruction transmitted from the wireless communication apparatus M (step 210). At that time, in the case of (2) described above, the operation determined in step 206 is first performed, and the operation indicated in the instruction transmitted from the wireless communication apparatus M is then performed. In contrast, in the case of (4) described above, the operation indicated in the instruction transmitted from the wireless communication apparatus M is first performed, and the operation determined in step 206 is then performed.

FIGS. 9A to 9E are diagrams illustrating concrete operations performed when the operation controller 550 cancels the determined operation.

This example indicates the case in which the determined operation is an operation of changing the screen displayed on the display 320 and in which the operation is canceled. The transition from FIG. 9A through FIG. 9B to FIG. 9C indicates the case in which the determined operation is canceled in the first exemplary operation described in FIG. 7. The transition from FIG. 9A through FIGS. 9B and 9D to FIG. 9E indicates the case in which the determined operation is canceled in the second exemplary operation described in FIG. 8.

This example illustrates a case in which, on the home screen illustrated in FIG. 9A, a user presents a smartphone that is the wireless communication apparatus M, to the communication unit 330 as illustrated in FIG. 9B. The example illustrates a case in which, at that time, the wireless communication apparatus M comes into contact with the display 320. In this case, the wireless communication apparatus M comes into contact with the "Scanner (stored in box)" icon I.

Thus, in the present exemplary embodiment, as control for canceling the determined operation, control is exercised so that the screen display displayed before the contact is detected is maintained when contact with the display 320 is detected.

At that time, in the first exemplary operation, control for canceling the determined operation is such that transition of the screen displayed on the display 320 is not made when contact with the display 320 is detected. Therefore, as illustrated in FIG. 9C, the screen displayed on the display 320 is not changed, and the home screen is continuously displayed.

In contrast, in the second exemplary operation, the operation controller 550 first starts the determined operation. Therefore, as illustrated in FIG. 9D, transition of the screen displayed on the display 320 is made. In this case, the screen displayed on the display 320 is changed to the setting screen for the "Scanner (stored in box)" function.

However, after that, the operation controller 550 exercises control so that the operation is canceled. In this case, as control for canceling the determined operation, the operation controller 550 changes the screen displayed on the display 320 when contact with the display 320 is detected, and then makes a transition to the screen that was displayed. As a result, as illustrated in FIG. 9E, the screen displayed on the display 320 is returned to the home screen previously displayed.

According to the exemplary embodiment described above, even when the wireless communication apparatus M comes into contact with the display 320, it is difficult to initiate an operation of the image forming apparatus 1, which is different from an operation of the image forming apparatus 1 caused by communication between the wireless communication apparatus M and the image forming apparatus 1.

In the above-described example, description is made by taking the image forming apparatus 1 as an example. However, this is not limiting. The above-described embodiment may be applied to any apparatus as long as the apparatus uses the display 320 and the communication unit 330.

In the above-described example, the light detecting unit 310 detects a detection target such as a user's finger. Alternatively, without the light detecting unit 310, a touch panel may be used as the display 320.

The touch panel is a combination of a display such as a liquid crystal panel and a position detecting unit. When a detection target T such as a user's finger comes into contact with the display, the position detecting unit detects the position at which the detection target T comes into contact with the display. Thus, the user may operate the apparatus by touching a screen displayed on the display. The touch panel is not particularly limited. Various types of touch panels, such as a resistance film touch panel or an electrostatic capacitance touch panel, may be used.

Even when a touch panel is used as the display 320, the wireless communication apparatus M may come into contact with the touch panel. This may initiate an operation of the image forming apparatus 1, which is different from an operation of the image forming apparatus 1 caused by communication between the wireless communication apparatus M and the image forming apparatus 1. Therefore, when the wireless communication apparatus M is detected on the display 320, control is exercised so that an operation of the image forming apparatus 1 based on the detection result is canceled. Thus, it is difficult to initiate an operation of the image forming apparatus 1, which is different from an operation of the image forming apparatus 1 caused by communication between the wireless communication apparatus M and the image forming apparatus 1. When an electrostatic capacitance touch panel is used, it is difficult to detect the wireless communication apparatus M that is present on the display 320. When a resistance film touch panel is used, it is easier to detect the wireless communication apparatus M. Therefore, the exemplary embodiment is effective especially for a case in which the display 320 is a resistance film touch panel.

In the above-described example, the image forming apparatus 1 may be interpreted as a detection apparatus including the display 320, the communication unit 330, and the control device 500. The functions of the control device 500 may be included in the user interface 300. In this case, the user interface 300 serves as a detection apparatus.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection apparatus comprising:
   a display that displays an image and that receives an operation corresponding to the image in such a manner that a user comes into contact with the image;
   a communication unit that communicates with a wireless communication apparatus performing near-field wireless communication; and
   a controller that, before or after the communication unit senses the wireless communication apparatus, when contact with the display is detected, exercises control in such a manner that an operation of the detection apparatus based on the detection result is canceled.

2. The detection apparatus according to claim 1,
   wherein, when the contact with the display is detected in a predetermined region of the display on a near side from the communication unit, the controller exercises control in such a manner that the operation of the detection apparatus based on the detection result is canceled.

3. The detection apparatus according to claim 2,
   wherein, when the contact with the display is detected in a predetermined region of the display on a far side from the communication unit, the controller exercises control in such a manner that the operation of the detection apparatus based on the detection result is continued.

4. The detection apparatus according to claim 1, wherein the control for canceling the operation of the detection apparatus causes a screen display to be maintained when the contact with the display is detected, the screen display being displayed before the contact is detected.

5. The detection apparatus according to claim 4, wherein the control for canceling the operation of the detection apparatus causes a screen displayed on the display not to be changed when the contact with the display is detected.

6. The detection apparatus according to claim 4, wherein, after a screen having been displayed on the display when the contact is detected is changed, the controller makes a transition to the screen having been displayed.

7. An image forming apparatus comprising:

an image forming unit that forms an image on recording material;

a receiving unit that includes a display and a communication unit, the display displaying an image and receiving an operation corresponding to the image in such a manner that a user comes into contact with the image, the communication unit communicating with a wireless communication apparatus performing near-field wireless communication, and that receives a user operation; and a controller that controls the image forming apparatus on a basis of a result of the user operation received by the receiving unit, wherein, before or after the communication unit senses the wireless communication apparatus, when contact with the display is detected, the controller exercises control in such a manner that an operation of the image forming apparatus based on the detection result is canceled.

* * * * *